Patented July 18, 1933

1,918,355

UNITED STATES PATENT OFFICE

CONWAY, BARON von GIRSEWALD AND ERICH STAHL, OF FRANKFORT-ON-THE-MAIN, GERMANY, ASSIGNORS TO AMERICAN LURGI CORPORATION, OF NEW YORK, N. Y., A CORPORATION OF NEW YORK

PROCESS FOR THE PRODUCTION OF SULPHATES

No Drawing. Application filed February 24, 1931, Serial No. 518,022, and in Germany September 13, 1929.

We have filed applications for patent in Germany, September 13, 1929, in Switzerland, December 16, 1930, in the Netherlands, January 2, 1931, in Norway, December 29, 1930, in Russia, January 2, 1931, in Sweden, December 20, 1930, in Italy, December 26, 1930, in Austria, December 9, 1930, and in Czechoslovakia, January 10, 1931.

This invention relates to a process for the production of sulphates.

In our earlier patent application (Serial Number 438,894) we have protected a process for the production of sulphates, in which gaseous mixtures of sulphur dioxide and oxygen—the latter being advantageously in excess—and preferably those in which the sulphur dioxide content is below, or does not substantially exceed 5%, are introduced, in a very finely divided state—obtained, for example, by being pressed through porous substances, (especially porous slabs) or by means of nozzles or any other (such as mechanical) means—into an aqueous medium care being taken to neutralize the acid formed in the reaction mixture by means of basic substances, such as ammonia, copper oxide, zinc oxide or the like, and preferably by the continuous introduction of the basic substances, in such quantity into the reaction liquid, during the introduction of the gaseous mixture containing sulphur dioxide, that the reaction of said liquid is maintained as nearly neutral as possible during the oxidation process. According to one method of carrying out the process, the reaction can be wholly or partially performed at elevated temperature, and, if desired, in such a manner that the sulphate formed at the elevated temperature is allowed to accumulate in the solution to an extent exceeding the limit of saturation at ordinary temperature, the solution being then freed from the excess of sulphate by cooling, whereupon the operation can be continued with the residual solution. Alternatively, the oxidation process can be carried on, at elevated temperature, until the accumulation of sulphate exceeds the limit of saturation in the hot liquid, the sulphate which is thereafter continuously formed and deposited being continuously or intermittently removed from the reaction liquid.

According to another embodiment, and especially in operating with concentrated solutions, the oxidation may be effected in presence of small quantities of water-soluble catalysts, especially salts of the heavy metals, such as cupric sulphate, ferric sulphate, manganese sulphate, cuprous chloride and the like. The chief consideration governing the choice of the catalyst is that there should be no precipitation of the active metallic compounds—for example, on neutralizing the solution—whilst, when copper in the form of sulphate is employed, it is advisable to add a soluble halide, such as sodium chloride, in order to retain the copper in solution, as cuprous chloride.

In a further embodiment of the process according to our earlier patent, instead of introducing both the oxygen (or gas containing same) needed for the oxidation and the sulphur dioxide (in the form of its mixture), in a finely divided state, into the aqueous medium, only the oxygen (or gas, such as air, containing same) may be introduced, in a finely divided state, into the aqueous medium, the latter containing sulphurous acid or salts of same—such as neutral or/and acid sodium—or ammonium sulphite—or into which sulphur dioxide (or a gaseous mixture containing same) is introduced in any convenient manner during the introduction of the gas containing oxygen. Alternatively, sulphurous acid or a salt of same, may be introduced, in the form of a solution or as a solid salt, into said aqueous medium.

This manner of operating offers the advantage, when the sulphur dioxide is introduced in the gaseous form, that the said gas no longer need be carefully freed from flue dust—in view of the risk of clogging the pores of the feed devices—and also that corrosion of the metal parts of the compressor by sulphur dioxide is obviated, whilst, in general, only a small volume of gas has to be brought to the requisite pressure for obtaining fineness of division—for example by forcing the same through porous slabs—and the transmission surfaces can be reduced in size, for the same total efficiency.

When operating in this manner, instead of introducing only the gas, containing oxygen and free from sulphur dioxide, into the aqueous medium in a finely divided state, one may also introduce a portion of the sulphur dioxide in a finely divided state, for example in admixture with air, the remainder being introduced as gas, or in liquid, solid or different forms, in admixture with air if desired, by any other convenient means.

Acording to the present invention in the oxidation of sulphurous acid, in an aqueous medium—in any convenient form—if desired, in the condition of an acid sulphite, or introduced into the aqueous medium, in any convenient form, during the oxidation process—by the passage of finely divided oxygen, or gases containing same, through said aqueous medium, the basic substances employed for combining with a portion at least of the acids produced, may consist of a basic phosphate, such as a tertiary or secondary alkali phosphate. These phosphates, which may be added to the aqueous solution, in a solid, dissolved or suspended form, before or/and during the introduction of the oxygen, or gases containing same, are converted into phosphates of lower basicity by the free sulphuric acid formed.

In this manner therefore, according to the kind and quantity of the phosphates introduced, there are obtained, in addition to the corresponding sulphates, the corresponding secondary or primary phosphates, namely in the case of trialkali phosphate the corresponding di- or mono-alkali phosphate, and in the case of dialkali phosphate the corresponding mono-alkali phosphate. Owing to their greater solubility at low temperatures, the alkali phosphates formed in this manner can be easily separated from the simultaneously formed sulphates by crystallization.

Moreover, by starting, for example, with a concentrated phosphate solution, $SO_2$ can be passed therethrough, together with an excess of air (which may be wholly or partially mixed therewith) until the desired degree of conversion has been attained. In such case, the excess of alkali sulphate is deposited on cooling, or even, in the event of higher concentration, during the oxidation process itself.

Example 1

500 grams of $Na_3PO_4$, 12 aq. are gradually introduced into 1200 cc. of water at 80° C., and at the same time a mixture of air and 5% of $SO_2$ is blown in through a microporous plate. The solution contains 25 grams of phosphorus, 80 grams of $SO_3$ and 8 grams of $SO_2$ per litre. On cooling to 0° C., 300 grams of Glauber's salt containing 0.1% of P, separate out in crystal form.

500 grams of phosphate are added to the mother liquor in a similar manner, and after the mixture of $SO_2$ and air has again been blown through a further 300 grams of Glauber's salt crystallize out. When the saturation limit for $NaH_2PO_4$ has been reached, this salt can be isolated, for example by concentrating the solution.

Example 2

1000 grams of disodium phosphate, $Na_2HPO_4$, 12 aq., are gradually introduced into 1200 cc. of water at 80° C., and at the same time, a mixture of air and 5% of $SO_2$ is blown in, in a finely divided state, through the microporous false bottom of the vessel, until the calculated acidity for monosodium sulphate has been attained. On cooling to 0° C., 350 grams of Glauber's salt, containing about 0.1% of P, crystallize out.

After a further addition of 1000 grams of $Na_2HPO_4$, 12 aq. to the mother liquor separated from the Glauber's salt, $SO_2$ and air are again passed through in similar manner. By cooling the resulting solution, another 400 grams of Glauber's salt crystals are obtained. The final liquor separated from these crystals contains 99 grams of P and 14 grams of $SO_3$ per litre. After the solution has been correspondingly concentrated, monosodium phosphate, $NaH_2PO_4$, $H_2O$ crystallizes out.

Example 3

750 grams of tripotassium phosphate, $K_3PO_4$ (containing 10.7% of P) are gradually introduced into 1200 cc. of water, whilst at the same time a mixture of air and 5% of $SO_2$ is blown in, until the acidity corresponding to dipotassium phosphate has been attained. On cooling to 0° C., 150 grams of potassium sulphate crystallize out.

Another 750 grams of tripotassium phosphate are added to the mother liquor freed from the potassium sulphate, the mixture of air and $SO_2$ being again blown in as before. After cooling the solution to 0° C., there are finally obtained a further 200 grams of potassium sulphate and a mother liquor containing 90 grams of P and 20 grams of $SO_3$ per litre. On concentration, and recrystallization of the first crystalline deposit of dipotassium phosphate, $K_2HPO_4$, (which still contains about 10% of potassium sulphate), the said phosphate can be obtained in a pure state.

Example 4

360 grams of $K_3PO_4$ (containing 10.7% of P), dissolved in 400 cc. of water, are gradually introduced into 800 cc. of water, gas containing 5% of $SO_2$ being introduced at the same time. After the acidity corresponding to the salt $KH_2PO_4$ has been attained, air is passed through for a further 2 hours, until all the sulphite has been oxidized to sulphate. About 98% of the $SO_2$ gas is utilized. On cooling to 0° C., 136 grams of $K_2SO_4$ (with 0.2% of P) crystallize out. The reaction cycle is repeated with the mother liquor until a solution containing 65 grams of P (as $KH_2PO_4$) and 25 grams of $SO_3$ per litre is obtained. On the solution being concentrated to half the original volume, 400 grams of salt (containing 90% of $KH_2PO_4$) per litre crystallize out and can be freed from the remainder of the potassium sulphate by recrystallization from water.

We claim:—

1. Process for the production of alkali metal sulphates and phosphates, which comprises introducing very finely divided air into an aqueous solution, into which sulphurous acid, in any convenient form and manner, is introduced as well as a water-soluble basic alkali metal phosphate.

2. Process for the production of alkali metal sulphate and alkali metal phosphates which comprises introducing a very finely divided gas, consisting at least in part of free oxygen, into an aqueous solution, into which sulphurous acid, in any convenient form and manner, is introduced as well as a basic alkali metal phosphate.

3. Process for the production of alkali metal sulphate and alkali metal phosphates which comprises introducing a very finely divided gas, consisting at least in part of free oxygen, into an aqueous solution, into which sulphurous acid, in any convenient form and manner, is introduced as well as a trialkali phosphate.

4. Process for the production of alkali metal sulphate and alkali metal phosphates which comprises introducing a very finely divided gas, consisting at least in part of free oxygen, into an aqueous solution, into which sulphurous acid, in any convenient form and manner, is introduced as well as a trialkali phosphate in sufficient quantity for the conversion of the tribasic phosphate into the dibasic salt.

5. Process for the production of alkali metal sulphate and alkali metal phosphates which comprises introducing a very finely divided gas, consisting at least in part of free oxygen, into an aqueous solution, into which sulphurous acid, in any convenient form and manner, is introduced as well as a dibasic alkali phosphate in sufficient quantity for the conversion of the dibasic phosphate into the monobasic salt.

CONWAY, BARON von GIRSEWALD.
ERICH STAHL.